May 30, 1933.

H. T. MOORE

ROAD GUARD

Re. 18,848

Original Filed July 3, 1930

Inventor
Harold T. Moore
by Parker & Carter.
Attorneys.

Reissued May 30, 1933

Re. 18,848

UNITED STATES PATENT OFFICE

HAROLD T. MOORE, OF CHICAGO, ILLINOIS, ASSIGNOR TO TUTHILL SPRING COMPANY, OF CHICAGO, ILLINOIS, A CORPORATION OF ILLINOIS

ROAD GUARD

Original No. 1,839,328, dated January 5, 1932, Serial No. 465,589, filed July 3, 1930. Application for reissue filed February 23, 1933. Serial No. 659,353.

This invention relates to a road guard. It has for one object to provide a guard which may be applied along one or both edges of a road to prevent vehicles from running off. It has for another object to provide a guard of such construction that a vehicle running into it or grazing it will not be injured. Another object is to provide such a guard which is yielding and will tend to cushion the shock of the vehicle against it. Another object is to provide such a guard in which a continuous and smooth contacting surface is provided against which a vehicle may run and along which it may slide or scrape without damage to the vehicle or to the guard or fence.

Other objects will appear from time to time in the specification and claims.

My invention is illustrated more or less diagrammatically in the accompanying drawing, wherein.

Like parts are designated by like characters throughout the specification and drawing.

A indicates a road surface. The road may, of course, be of any suitable construction. My invention is not limited to association with any particular road surface or construction. Along the road surface or adjacent it there are positioned a number of posts B. The posts may be perforated as at $B^1$ and through these perforations a cable or bar $B^2$ may be positioned. While I have shown only a single cable, obviously additional cables might be used.

Figure 5:
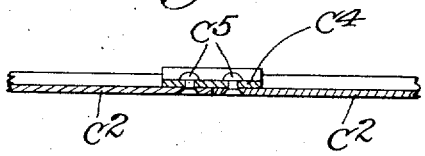
Figure 5 is a detailed longitudinal cross section showing a joint in the guard member.

C is a spring element curved as shown. It is preferably attached to the post B adjacent the ground level. Thus any strain or shock transmitted through the spring element C to the post B comes upon the post close to the ground and the danger of breaking or dislodging the post is reduced. The spring elements C may be fastened to the posts in any suitable manner as, for example, by bolts $C^1$, $C^1$. A concave striking or contacting piece is formed preferably of a number of members $C^2$ which are fastened to the springs C by bolt $C^3$ or otherwise. As shown in detail in Figure 5, if the striking member is made up of a number of pieces, they are preferably joined butt to butt and at the joint a plate $C^4$ is fastened by rivets $C^5$ or otherwise.

Figure 4:
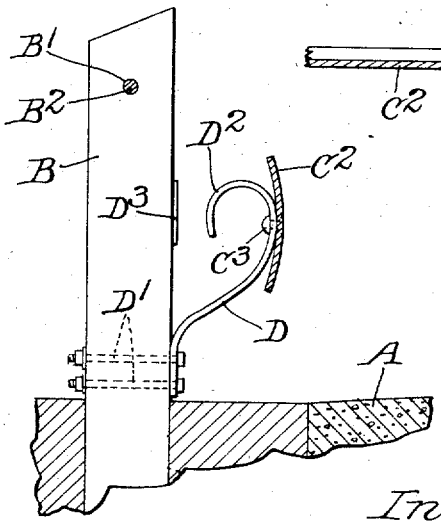
Figure 4 is a similar view showing my invention in modified form.

As illustrated in Figure 4, a modified form of spring member is used. This is a spring member D which, throughout the major portion of its length, may be similar to the member C. It is fastened to or mounted upon the fence post, for example by bolts $D^1$, $D^1$ and it is provided with a downwardly and rearwardly curved extension $D^2$. A striking or wearing plate $D^3$ may be added to the post opposite the portion $D^2$ of the spring.

It will be understood that while I have herewith shown and described a practical, operative device, nevertheless many changes might be made in the size, shape, number and disposition of parts without departing materially from the spirit of my invention and I wish, therefore, that my showing be taken as in a sense diagrammatic.

Figure 1:
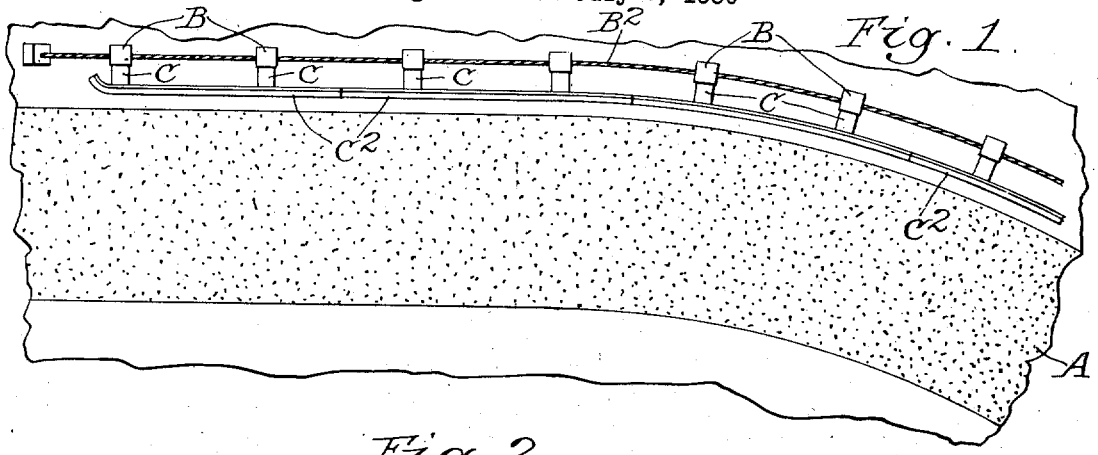
Figure 1 is a plan view showing my guard in position along a road at a curve.
Figure 2:
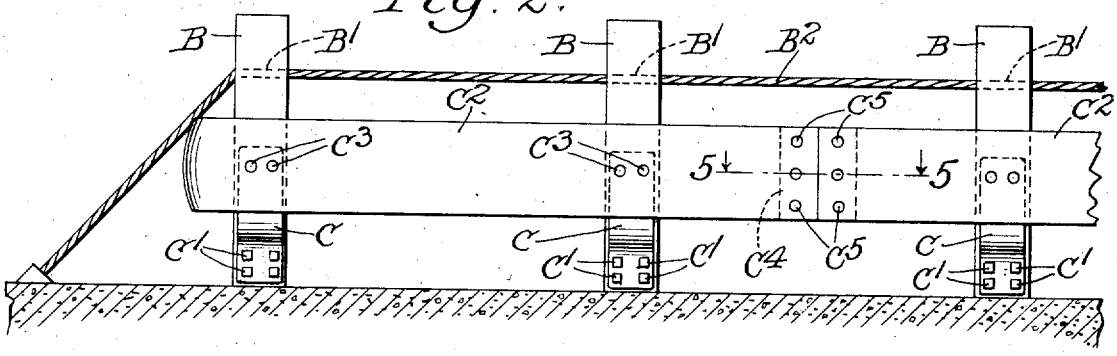
Figure 2 is a side elevation of a portion of the guard rail construction.
Figure 3:
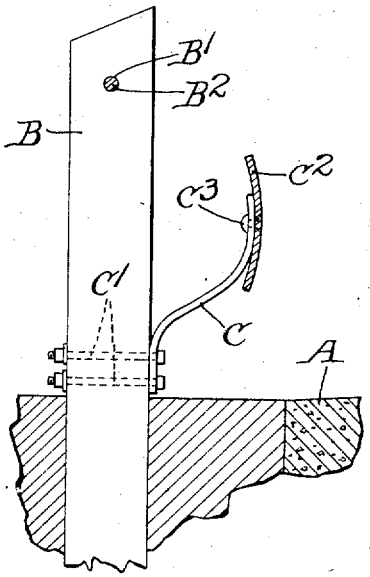
Figure 3 is a side elevation with parts in section, showing one form of the invention.

The use and operation of my invention are as follows:

In either form of the spring shown in Figure 3 or Figure 4, the contacting plate or guard rail presents a continuous and smooth surface toward the road so that a vehicle running off the road sufficiently to strike this guard plate will not contact anything which will directly stop it but will merely run against and slide or scrape along the rail until the operator has stopped the vehicle or has again brought it back onto the road surface. In either form, since the rail is spring held by means either of the springs C or D, a certain amount of yielding is possible. This, of course, tends to cushion the effect of the shock due to the vehicle contact and thus to protect the vehicle and the guard rail structure.

In the form illustrated in Figure 4, after sufficient yielding of the spring D has occurred, the curved portion $D^2$ will contact the fence post B or the striking plate $D^3$ in case one is used. If pressure continues thereafter, the spring part $D^2$ may be further compressed and bent and thus a further yielding of the guard rail is permitted but the resistance to yielding is greater after the spring D has been sufficiently bent to bring the spring portion $D^2$ in contact with either the fence post or with the striking plate $D^3$ upon it.

The cable or bar $B^2$, being situated above the vehicle contacting member $C^2$, tends to strengthen the fence structure and also in case a vehicle might strike with such force as to tip over, it tends to prevent the vehicle from tipping completely over. Thus there is provided in addition to the guard rail, a further safety device which in the case of extremely violent contact tends to prevent complete tipping over of the vehicle.

The main vehicle contacting portion or guard rail $C^2$ is preferably situated at about the height from the ground of a hub. It is sufficiently wide so that it will be contacted by the hub of almost any standard vehicle. Its width is such as to accommodate vehicles of a good many different axle or hub heights.

Thus in my invention I provide, upon one side or on both sides of a road, a continuous, smooth and preferably concave ribbon of metal which is preferably of spring steel. The concavity of this ribbon strengthens or reinforces it, making it stronger and less liable to being deformed than if it were flat. This ribbon is set out from the fence posts or the supporting structure for it. It is spring held so that it may yield outwardly. It is of a height to be contacted by the hubs of almost all standard vehicles and there is associated with it a cable or upper safety structure designed to be contacted only by vehicles which are partially tipped over and to prevent their further tipping. The additional spring portion $D^2$ which further cushions the ribbon $C^2$ is useful but not essential. The cable or bar $B^2$ also is useful in strengthening the fence structure but the action of the spring C may under many circumstances be sufficient and the bar or cable $B^2$ be omitted.

I claim:

1. In a guard rail construction for roads, a vehicle guard member, a supporting structure therefor, comprising fixed supports, spring supports on said fixed supports and attached thereto at a point adjacent the ground surface, said spring supports formed with a plurality of spring portions, one adapted to come into operation when the other has yielded a predetermined degree and thereby to increase resistance to further movement of the guard member.

2. In a guard rail construction for roads, a vehicle guard member, a supporting structure therefor, comprising fixed supports, spring supports on said fixed supports and attached thereto at a point adjacent the ground surface said last mentioned supports constituting the sole connection between the guard member and the fixed supports, and a second vehicle guard member carried by said supporting structure and positioned outwardly and upwardly from the road with respect to the position of said first mentioned guard member.

3. In a guard rail construction for roads, a vehicle guard member, formed of spring material, a supporting structure therefor, comprising fixed supports, spring supports on said fixed supports and attached thereto at a point adjacent the ground surface said last mentioned supports constituting the sole connection between the guard member and the fixed supports, and a second vehicle guard member carried by said supporting structure and positioned outwardly and upwardly from the road with respect to the position of said first mentioned guard member.

4. In a guard rail construction for roads, a continuous, smooth surfaced, concave vehicle guard member, formed of spring material, a supporting structure therefor, comprising fixed supports, spring supports on said fixed supports and attached thereto at a point adjacent the ground surface, said spring supports formed with a plurality of spring portions, one adapted to come into operation when the other has yielded a predetermined degree and thereby to increase resistance to further movement of the guard member.

5. In a guard rail construction for roads, a continuous, smooth surfaced, concave vehicle guard member, formed of spring material, a supporting structure therefor, comprising fixed supports, spring supports on said fixed supports and attached thereto at a point adjacent the ground surface, said spring supports formed with a plurality of spring portions, one adapted to come into operation when the other has yielded a predetermined degree and thereby to increase resistance to further movement of the guard member, and a second vehicle guard member carried by said supporting structure.

6. In a guard rail construction for roads, a continuous, smooth surfaced, concave vehicle guard member, formed of spring material, a supporting structure therefor, comprising fixed supports, spring supports on said fixed supports and attached thereto at a point adjacent the ground surface, said spring supports formed with a plurality of spring portions, one adapted to come into operation when the other has yielded a predetermined degree and thereby to increase resistance to further movement of the guard member, and a second vehicle guard member carried by said supporting structure, and positioned outwardly and upwardly from the road with respect to the position of said first mentioned guard member.

7. In a guard rail construction for roads, a vehicle guard member in the form of a longitudinally extending ribbon of metal positioned generally at the height of the hubs of passing automobiles, a plurality of longitudinally spaced fixed supports therefor, positioned along the side of the road, and spring supports positioned on said fixed supports and secured thereto adjacent the ground level of said fixed supports, said spring supports extending upwardly from the ground level and inwardly from the fixed supports and terminating in free ends to which the ribbon is attached.

8. In a guard rail construction for roads, a vehicle guard member in the form of a longitudinally extending concave ribbon of metal positioned generally at the height of the hubs of passing automobiles, a plurality of longitudinally spaced fixed supports therefor, positioned along the side of the road, and spring supports positioned on said fixed supports and secured thereto adjacent the ground level of said fixed supports, said spring supports extending upwardly from the ground level and inwardly from the fixed supports and terminating in free ends to which the concave ribbon is attached, the concave side of said ribbon facing outwardly from the road in such fashion that whatever car hubs engage said ribbon will engage the convex inner face thereof.

9. In a guard rail construction for roads, a vehicle guard member which includes a longitudinally extending metal ribbon positioned generally at the heights of the hubs of passing automobiles, fixed supporting means therefor, and a plurality of leaf springs, each such leaf spring being secured only at one end to the fixed supporting means, adjacent the ground level, and extending upwardly and inwardly therefrom toward the road, the guard member being secured to the free upper portions of said leaf springs.

10. In a guard rail construction for roads, a vehicle guard member which includes a longitudinally extending metal ribbon positioned generally at the heights of the hubs of passing automobiles, fixed supporting means therefor, and a plurality of leaf springs, each such leaf spring being secured only at one end to the fixed supporting means, and extending inwardly therefrom toward the road, the guard member being secured to the free outer portions of said leaf springs.

11. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, said ribbon being formed of a plurality of separate members.

12. In a guard rail construction for roads or the like, a vehicle guard member which includes supporting means positioned adjacent the side of the roadway, a plurality of leaf springs, each such leaf spring being secured only at one end of said supporting means and extending inwardly from said supporting means toward the road and guard means secured to the free outer portions of said leaf springs, said guard means including an extended metal ribbon positioned generally at the heights of the hubs of passing automobiles, and being concavo-convex in vertical transverse section, the convex side facing inwardly toward the road.

13. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, the longitudinal axes of said springs lying in generally vertical planes transverse to the road.

14. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, said ribbon being formed of a plurality of separate members, said members being individually directly secured to the leaf springs.

15. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, said ribbon being formed of a plurality of separate members, said separate members being secured at their ends to each other and being additionally directly secured to the leaf springs.

16. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, each such leaf spring including a curved end portion to which the metal ribbon is secured, the metal ribbon being concavo-convex in vertical transverse section, the convex side facing inwardly toward the road and the concave side conforming generally to the curved end portion of the springs.

17. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, said ribbon being formed of a plurality of separate members, the supporting means adjacent the roadway including a plurality of upright posts, each leaf spring being secured to one of said posts.

18. In a guard rail construction for roads or the like, a vehicle guard member which includes supporting means positioned adjacent the side of the roadway, a plurality of leaf springs, each such leaf spring being secured only at one end to said supporting means and extending inwardly from said supporting means toward the road and guard means secured to the free outer portions of said leaf springs, said guard means including an extended metal ribbon positioned generally at the heights of the hubs of passing automobiles, each such leaf spring including a curved end portion to which the metal ribbon is secured, the metal ribbon being concavo-convex in vertical transverse section, the convex side facing inwardly toward the road and the concave side conforming generally to the curved end portion of the springs, the supporting means adjacent the roadway including a plurality of upright posts, each leaf spring being secured to one of said posts, each such spring including a generally flat portion secured directly to a post and conforming generally to the opposed surface of the post, the longitudinal axes of the springs lying in generally vertical planes transverse to the road.

19. In a guard rail construction for roads, a vehicle guard member which includes a longitudinally extending metal ribbon positioned generally at the heights of the hubs of passing automobiles, fixed supporting means therefor, and a plurality of leaf springs, the long axis of each such leaf spring lying generally in a vertical plane transverse of the road, and extending inwardly from the fixed supporting means toward the road and being secured to said supporting means, the guard member being secured to portions of said springs remote from the pints of attachment of the springs to the supporting means, each such spring being secured to said supporting means at one point only.

HAROLD T. MOORE.